United States Patent [19]
Murata et al.

[11] Patent Number: 5,711,387
[45] Date of Patent: Jan. 27, 1998

[54] ENGINE COOLING SYSTEM

[75] Inventors: Shinichi Murata; Masahiko Kubo; Tetsuo Kataoka; Kiyoshi Hatano, all of Kyoto, Japan

[73] Assignee: Mitsubishi Jidosha Kogyo Kabushiki Kaisha, Tokyo, Japan

[21] Appl. No.: 653,922

[22] Filed: May 22, 1996

Related U.S. Application Data

[63] Continuation of Ser. No. 114,352, Sep. 1, 1993, abandoned.

[30] Foreign Application Priority Data

Sep. 4, 1992 [JP] Japan ................................ 4-236920

[51] Int. Cl.$^6$ ................................................ B60K 11/06
[52] U.S. Cl. ............................................ 180/68.1; 180/68.4
[58] Field of Search ................................ 180/68.1, 68.4, 180/68.2, 89.2, 297, 309

[56] References Cited

U.S. PATENT DOCUMENTS

| | | | |
|---|---|---|---|
| 3,820,327 | 6/1974 | Henault | 60/286 |
| 4,186,693 | 2/1980 | Thien et al. | 180/68.4 |
| 4,598,786 | 7/1986 | Kirchweger | 180/309 |
| 4,724,802 | 2/1988 | Ishii | 123/90.16 |
| 4,768,475 | 9/1988 | Ikemura | 123/90.16 |
| 4,844,023 | 7/1989 | Konno et al. | 123/90.16 |
| 4,848,285 | 7/1989 | Konno | 123/90.16 |
| 4,883,027 | 11/1989 | Oikawa et al. | 123/90.16 |
| 5,050,701 | 9/1991 | Okui et al. | 180/68.1 |
| 5,099,806 | 3/1992 | Murata et al. | 123/90.16 |
| 5,180,003 | 1/1993 | Kouzel et al. | 180/68.1 |
| 5,193,608 | 3/1993 | Sekine et al. | 180/68.1 |
| 5,195,607 | 3/1993 | Shimada et al. | 180/309 |
| 5,207,187 | 5/1993 | Kurohara et al. | 180/68.1 |
| 5,209,285 | 5/1993 | Joshi | 180/68.1 |

FOREIGN PATENT DOCUMENTS

| | | |
|---|---|---|
| 2070468 | 9/1971 | France . |
| 2240681 | 2/1973 | Germany . |

OTHER PUBLICATIONS

Patent Abstracts of Japan vol. 12, No. 152 (M-695) (2999) 11 May 1988 & JP-A-62 273 113 (Toyota) *Arrangement of Radiator and Cooler Condenser.*

*Primary Examiner*—Brian L. Johnson
*Assistant Examiner*—Michael Mar

[57] ABSTRACT

An engine cooling system for inducing a stream of cold air via a radiator fan toward the rear part of a vehicle so as to cool a vehicle engine, which includes catalysts downstream of an exhaust manifold. The radiator fan is displaced in front the engine so that substantially no cold airstreams from the radiator fan directly strike the exhaust manifold. Thus, exhaust emissions are prevented from being excessively cooled, so that the catalysts can become active to purify the exhaust emissions reliably. The engine cooling system is effective to keep the catalysts active when the engine is in the partial cylinder operation mode in which the exhaust emissions tend to be lowered in the temperature.

8 Claims, 3 Drawing Sheets

ENGINE COOLING SYSTEM

This application is a continuation of application Ser. No. 08/114,352 filed on Sep. 1, 1993, now abandoned.

BACKGROUND OF THE INVENTION

1. Field of the Invention

This invention relates to an engine cooling system for a front engine vehicle by means of a radiator and airstreams induced by a radiator fan and by the motion of the automobile.

2. Description of the Related Art

Generally, a front engine vehicle directly induces a stream of cold air to its engine body by its motion. Furthermore, the engine is indirectly cooled by a radiator positioned in front of the engine, through which water is conducted, and across which airstreams are induced by a fan.

When running at a speed above a preset value, such a front engine vehicle can sufficiently induce a cold airstream to cool its engine. Conversely, when running at a very low speed or when out of motion, the vehicle cannot induce a cold airstream to the engine body, which leaves the engine hot. To prevent such a problem, the vehicle is usually equipped with a fan between the radiator and the engine. The fan is operated by the rotational force of the engine, or by a motor. In this arrangement, the fan conducts a cold airstream to the engine and the radiator so as to reliably cool the engine body.

At present, there are known vehicle engines which can assume a partial cylinder operation mode by disconnecting a part of cylinders so as to accomplish the reduction of an output and a substantial saving of fuel.

A control unit for such a vehicle engine selects a suitable operation mode based on various engine operation data. For instance, when the partial cylinder operation mode is selected, the control unit provides a variable valve operating mechanism with a command for this mode. In response to the command, the variable valve operating mechanism interrupts the operation of intake and exhaust valves associated with the cylinders to be disconnected. In addition, the control unit sends this command to a fuel supply system, which suspends the fuel supply to the disconnected cylinders. In the partial cylinder operation mode, the engine produces fewer thermal energies than those in the full cylinder operation mode. Therefore, exhaust emissions are efficiently heat-radiated in a exhaust pipe, so that they tend to be extensively cooled.

The engine exhaust emissions usually include noxious substances such as carbon monoxide CO, hydrocarbons HC, and nitrogen oxides NOx. The exhaust emissions should be free from these substances when they are discharged into the atmosphere. For this purpose, three-way catalysts are disposed in the exhaust system of a popular gasoline-fueled engine so as to remove CO, HC and NOx from the exhaust emissions. Furthermore, a diesel engine includes the three-way catalyst so as to purify nitrogen oxides NOx.

The three-way catalyst has to be at its active temperature where it can effectively reduce and oxidize CO, HC and NOx so as to make these substance nontoxic, as shown in FIG. 5 of the accompanying drawings. FIG. 5 shows purification efficiencies of the three-way catalyst of a platinum group, which is used in a gasoline-fueled engine operating at a speed of 2400 rpm and an intake air pressure of −300 mmHg. The air-fuel ratio is maintained between 14.6 and 14.7. It can be seen that the purification efficiency of 50% can be attained for each of CO, HC and NOx when the exhaust emissions are in the temperature range of 340° C. to 350° C. (e.g. the efficient and active temperature). It is known that the reduction catalyst becomes active to reduce NOx when the exhaust emissions have the foregoing temperature.

Therefore, it is very important to maintain the exhaust emissions sufficiently hot to activate the catalyst.

The exhaust emissions extensively vary their temperature according to the operating conditions of the engine, airstreams induced by the motion of the vehicle, heat radiation from an exhaust manifold cooled by airstreams from the radiator fan, ambient temperature, and so on.

Especially, the temperature of the exhaust emissions tends to become low at the time of engine start-up, a low output, or a low ambient temperature. If heat-radiation is enhanced from the exhaust manifold which is cooled by airstreams induced by the motion of the vehicle and by the radiator fan, it is very difficult to keep the exhaust emissions sufficiently hot to activate the catalyst. Therefore, when activated at the initial stage of engine start-up, the three-way catalyst, a NOx catalyst, or a small front catalyst near a combustion chamber cannot oxide or reduce CO, HC and NOx in the exhaust emissions so as to make these substances substantially nontoxic. This would cause serious pollution of the atmosphere.

Furthermore, the exhaust emissions have a low temperature when the engine in the partial cylinder operation mode produces fewer thermal energies. Specifically, when the heat-radiation of the exhaust manifold is enhanced by airstreams induced by the radiator fan or by the motion of the vehicle, the exhaust emissions become further cold. Therefore, the catalyst cannot attain its effective temperature to eliminate CO, HC ahd NOx from the exhaust emissions. This phenomenon would also cause serious pollution of the atmosphere.

SUMMARY OF THE INVENTION

It is an object of this invention to provide an engine cooling system for preventing an unfavorable temperature decrease of the exhaust emissions, which may inversely affect the activation of the catalyst.

According to a first aspect of the invention, an engine cooling system comprises: a radiator positioned in front of an engine having a catalyst behind an exhaust manifold; and a radiator fan for inducing an airstream from the front part of the vehicle to the rear part thereof. The radiator fan is disposed at a position offset from the front side of the exhaust manifold so that the induced airstream does not directly reach the exhaust manifold.

In this arrangement, the airstream from the radiator fan does not directly strike the exhaust manifold, so that exhaust emissions are not extensively cooled and allow the catalyst to be active.

The catalyst may be a first catalyst that is disposed just under the exhaust manifold, thereby preventing the exhaust emissions from being extensively lowered in the temperature thereof by heat-radiation from the exhaust manifold and the catalyst.

Further, the catalyst may be an oxidation catalyst or a three-way catalyst.

The engine may be a horizontal engine, and may have the exhaust manifold disposed in front of the engine body.

The catalyst may be a second catalyst that is disposed in the middle of an exhaust pipe. The second catalyst may be a three-way catalyst.

In addition, the engine may be a vertical engine, and may have the exhaust manifold coupled to itself at a position opposite to the radiator fan.

In a second aspect of the invention, an engine cooling system comprises: a radiator positioned in front of an engine which has a partial cylinder operation mode by disconnecting a part of cylinders, and includes a catalyst disposed behind an exhaust manifold; and a radiator fan for inducing an airstream from the front part of the vehicle to the rear part of the vehicle. The radiator fan is disposed at a position offset from the front side of the exhaust manifold so that the induced airstream does not directly reach the exhaust manifold.

According to the second arrangement, the airstream from the radiator fan also does not directly strike the exhaust manifold of the engine. This arrangement is as effective as the foregoing arrangement of the engine cooling system.

In this arrangement, the catalyst may be a first catalyst that is disposed just under the exhaust manifold, thereby preventing the exhaust emissions from being extensively lowered in the temperature thereof by heat-radiation from the exhaust manifold and the catalyst during the partial cylinder operation mode.

The catalyst may be an oxidation catalyst or a three-way catalyst.

The engine may be a horizontal engine, and may have the exhaust manifold disposed in front of the engine body.

The catalyst may be a second catalyst that is placed in the middle of an exhaust pipe. The second catalyst may be a three-way catalyst.

In addition, the engine may be a vertical engine, and may have the exhaust manifold coupled to itself at a position opposite to the radiator fan.

BRIEF DESCRIPTION OF THE DRAWINGS

In all drawing figures, identical parts have identical reference numbers.

DESCRIPTION OF THE PREFERRED EMBODIMENTS

Figure 1:
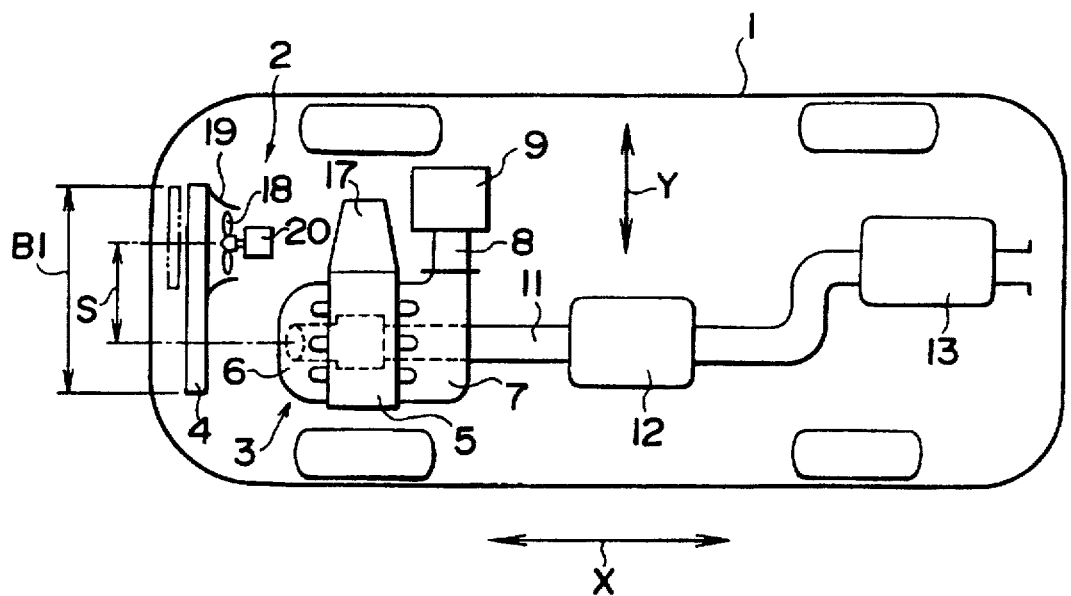
FIG. 1 is a schematic top plan view showing the configuration of a first engine cooling system for a front engine vehicle having the partial cylinder operation function.

According to a first embodiment of the invention, an engine cooling system is applied to an engine 3 which is used for a vehicle of the front drive wheel type and has the partial cylinder operation mode. The engine cooling system is disposed in an engine compartment 2 at the front part of a vehicle body 1. The engine 3 is an in-line horizontal engine having four cylinders. A radiator 4 is positioned in front of the engine 3 in the direction X shown in FIG. 1.

The engine 3 is installed on a main frame (not shown) of the vehicle body with its engine body 5 oriented in the direction Y. The engine body 5 accompanies an exhaust manifold 6 at its front side and an intake manifold 7 at its rear side. The intake manifold 7 is coupled to an intake pipe 8 and an air cleaner 9 in this order. The exhaust manifold 6 communicates with a front catalyst 10 and an exhaust pipe 1. The exhaust pipe 11 extends to a main catalyst 12 and reaches a muffler 13. The front catalyst 10 is positioned just under the exhaust manifold 6, while the main catalyst 12 is positioned in the middle of the exhaust pipe 11.

The front catalyst 10 is a well-known oxidation catalyst while the main catalyst 12 is a well-known three-way catalyst. The front catalyst 10 has a relatively small capacity so that it becomes active at an initial stage of the engine start-up period, and can effectively purify the exhaust emissions during this period. Conversely, the main catalyst 12 comprises noble metal such as platinum. When elevated above the effective temperature, the main catalyst 12 can effectively eliminate carbon monoxide CO, hydrocarbons HC and nitrogen oxides NOx from the exhaust emissions of the air-fuel mixture having a ratio near the stoichiometric ratio. The front catalyst 10 may be the three-way catalyst.

Figure 3:
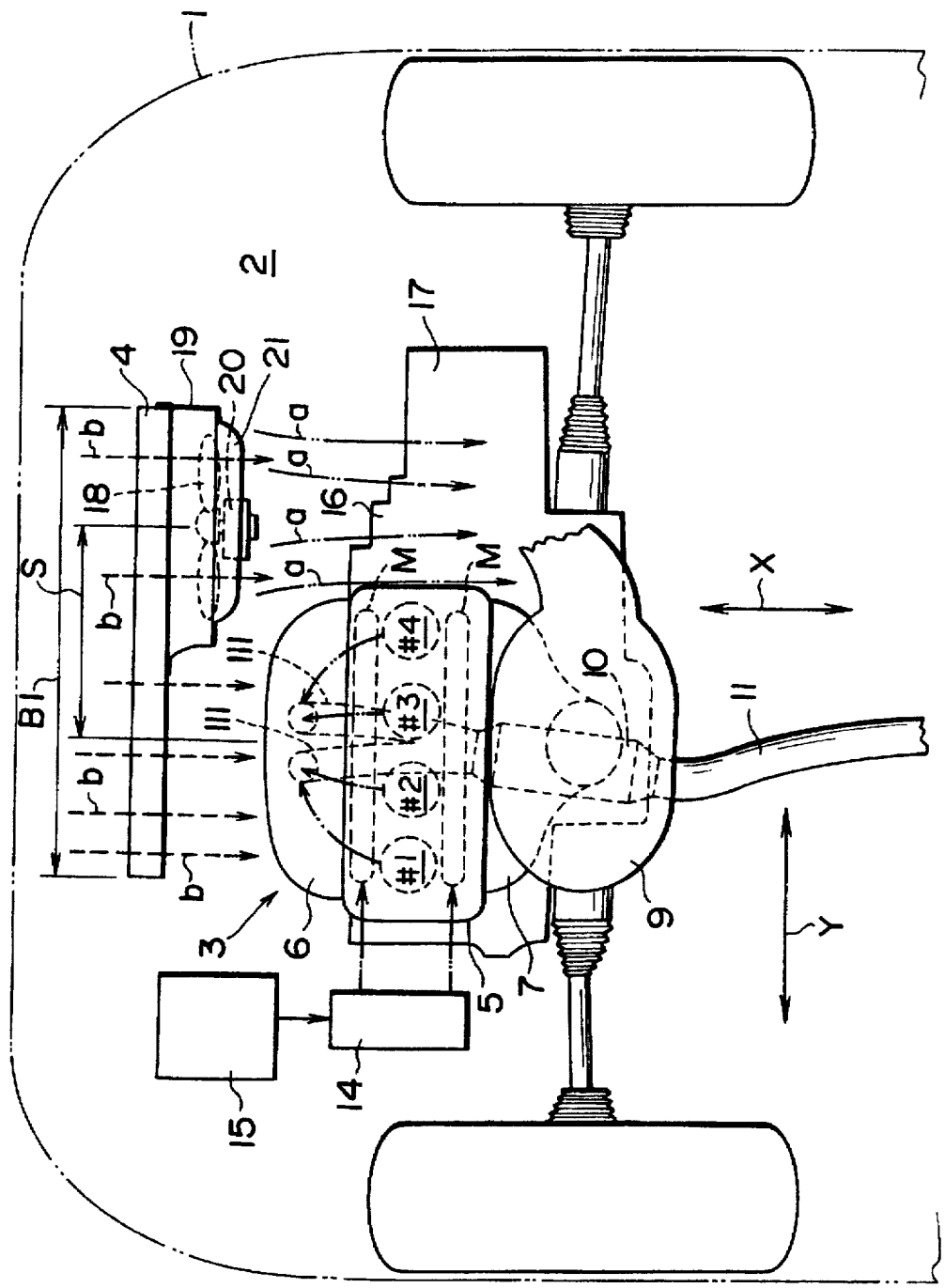
FIG. 3 is an enlarged schematic view showing the main part of the cooling system of FIG. 1.

In the partial cylinder operation mode, the cylinders #2 and #3 are continuously active while the cylinders #1 and #4 remain inactive in the engine 3. The exhaust ports (not shown) of the cylinders #1 and #2 merge while the exhaust ports (not shown) of the cylinders #3 and #4 merge as shown in FIG. 3. These exhaust ports are coupled to two points 111 of forked end of the exhaust pipe 11, so that the exhaust emissions flow through the exhaust pipe 11 to reach the front catalyst 10.

As shown in FIG. 3, the engine 3 includes, in its valve operating system, a variable valve operating mechanism M for selectively operating the intake and exhaust valves. The variable valve operating mechanism M is controlled by a hydraulic switching circuit 14, which is controlled by a controller 15.

When the full cylinder operation mode is selected, the controller 15 turns off the variable valve operating mechanism M, i.e. controls the mechanism M via the hydraulic switching circuit 14 in a manner such that the cylinders #1 to #4 are active. Further, the controller 15 provides the fuel supply system with the command for the full cylinder operation mode. In response to this command, the fuel supply system supplies fuel to all the four cylinders.

Conversely, when the partial cylinder operation mode is selected, the controller 15 turns on the variable valve operating mechanism M, i.e. controls the mechanism M so as to operate only the cylinders #2 and #3 and disconnect the cylinders #1 and #4 via the hydraulic switching circuit 14. Further, the controller 15 provides the fuel supply system with the partial cylinder operation command, so that fuel is supplied only to the cylinders #2 and #3 via their associated injectors (not shown). The variable valve operating mechanism M is described in the co-pending Japanese patent application No. Hei 2-182131 entitled VALVE SYSTEM FOR MOTOR VEHICLE filed on Jul. 10, 1990 (laid open under No. 4-72403).

Referring to FIG. 1, the radiator 4 is placed in front of the engine 3 in the engine room 2. The radiator 4 communicates with a water jacket (not shown) of the engine body 5 so as to circulate the cooling water thereto. When circulating through a radiator core (not shown), a warmed cooling water is cooled by airstreams a (induced by the radiator fan, and called "radiator airstreams a" hereinafter) and airstreams b (induced by the motion of the vehicle, and called "incoming airstreams b" hereinafter).

The radiator 4 has a width B1 across the vehicle body in the direction Y, and is shaped to cover the front areas of the engine body 5, a clutch 16 and a transmission 17. The radiator 4 is substantially as high as the engine body 5 as shown by B2 in FIG. 2. A radiator fan 18 is positioned behind the radiator 4. The radiator fan 18 leads cold airstreams via the radiator 4 toward the engine 3. A fan shroud 19 is disposed to surround the radiator fan 18 so as to guide the cold airstreams. The radiator fan 18 and a fan motor 20 are supported at the center of the shroud by suitable brackets 21. The motor 20 is controlled by the controller 15.

Figure 2:
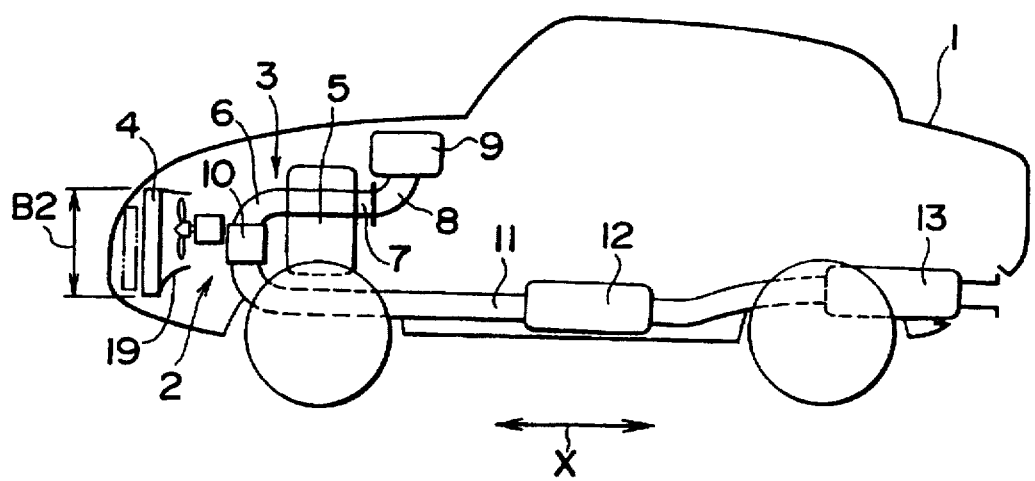
FIG. 2 is a side cross-sectional view of the vehicle of FIG. 1.

The shroud 19 is placed only on the right half area of the radiator 4 (FIGS. 1 and 3), i.e. the shroud is placed in a manner such that the center of the radiator fan 18 is offset by the distance S from the front center of the exhaust manifold 6. Therefore, when the radiator fan 18 is active, the radiator airstreams a are guided by the shroud 19 toward the clutch 16 and the transmission 17 but are not divided onto the exhaust manifold 6 of the engine body 5 as shown in FIG. 3. It is possible to place a heat exchanger for an air-conditioner in front of the radiator 4 at a position (shown by long and short dash lines) opposite to the radiator fan 18 as shown in FIGS. 1 and 2.

In operation, when the engine 3 undergoes a cold start, the radiator fan 18 remains inactive. The controller 15 actuates the radiator fan 18 at a proper timing after the completion of the cold start period of the engine. Thereafter, the radiator airstreams a are guided by the fan 18 via the shroud 19 toward the clutch 16 and the transmission 17, but do not directly flow toward the exhaust manifold 6 and the outer wall of the front catalyst 10 which is just under the exhaust manifold 6. Assume that the engine 3 is set in the partial cylinder operation mode under this condition, so that the total energies produced by the engine are accordingly reduced, which causes the exhaust emissions to be lower in their temperature. Since the radiator airstreams a are however made to flow wide of the exhaust manifold 6, the exhaust emissions are not further lowered in their temperature. Therefore, both the front catalyst 10 and the main catalyst 12 become active during the engine start-up period and can remain active to eliminate noxious substances effectively from the exhaust emissions.

During the motion of the vehicle, incoming airstreams b are induced to the entire area of the radiator 4, i.e. width B1 in FIG. 3, so as to cool the exhaust manifold 6, clutch 16 and transmission 17. The more rapidly the vehicle runs, the more incoming airstreams b flow toward the engine. Thus, the exhaust system can be sufficiently cooled during the high speed motion of the vehicle. Conversely, the slower the vehicle, the fewer incoming airstreams b flow to the engine. The exhaust emissions are not excessively cooled during the motion of the vehicle, so that the front and main catalysts 10 and 12 can function effectively.

Substantially no incoming airstreams b reach the engine during a very slow running or non-running of the vehicle. In such a case, the controller 15 provides the radiator fan 18 with a command to cool the engine at proper timings each time the engine cooling water exceeds the preset temperature. Thus, radiator airstreams a are conducted to the clutch 16 and the transmission 17. The engine is operating at a very low load or is idling in the partial cylinder operation mode under this condition, so that it produces relatively low energies. Since radiator airstreams a do not directly flow to the exhaust manifold 6 and the outer wall of the front catalyst 10, the exhaust emission flowing through the exhaust manifold 6 are not excessively lowered in their temperature. Thus, both the front catalyst 10 and the main catalyst can function effectively and reliably.

Figure 4:
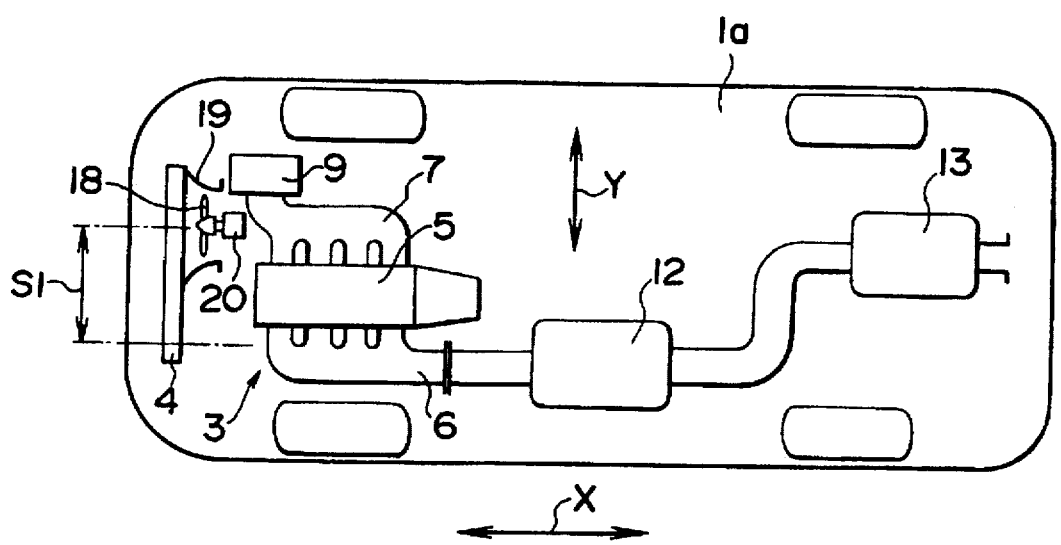
FIG. 4 is a schematic view of a second engine cooling system for the front engine vehicle having the partial cylinder operation function.
Figure 5:
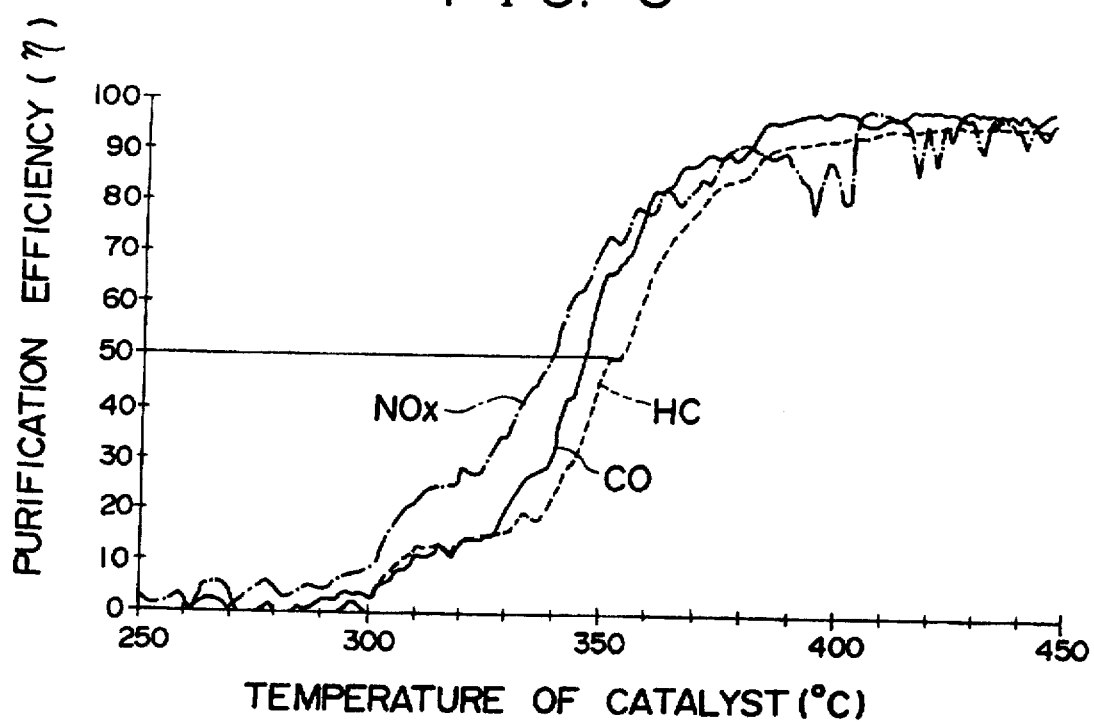
FIG. 5 is a graph showing purification efficiencies of a three-way catalyst.

An engine cooling system according to a second embodiment will be described referring to FIG. 4.

In this embodiment, the cooling system is applied to an in-line vertical four-cylinder engine with the partial cylinder operation mode. This engine 3 includes its crankshaft extending perpendicular to the axle, and the intake manifold 7 which is placed behind the radiator fan 18 and extends to the air cleaner 9.

The exhaust manifold 6 extends to the main catalyst 12, and is attached to the engine body 5 at a position which is displaced by the distance S1 from the axis of the radiator fan motor.

During the motion of the vehicle, incoming airstreams b are induced to the whole front area B1 of the radiator 4, and radiator airstreams a are guided by the fan shroud 19 to flow toward the intake manifold 7.

In the embodiment, the cooling system is effectively applicable to the in-line vertical engine similarly to the cooling systems of the foregoing embodiment.

As described so far, the radiator fan is positioned in front of the engine in a manner such that the radiator airstreams do not directly strike the exhaust manifold of the engine. Thus, the exhaust emissions flowing through the exhaust manifold are prevented from being excessively cooled by the radiator airstreams, thereby allowing the catalysts to be active to eliminate noxious substances from the exhaust emissions.

In the foregoing exhaust systems of the engine 3, the front catalyst 10 is disposed just under the exhaust manifold 6 and the main catalyst 12 follows downstream of the front catalyst 10. Alternatively, it is possible that a NOx catalyst may be placed downstream of the exhaust manifold of a diesel engine and the radiator fan may be positioned forward of the exhaust manifold with a certain distance displaced from the front part of the exhaust manifold.

According to the invention, the engine 3 includes the variable valve operating mechanism M in its valve system. When the control unit 15 issues the command for the partial cylinder operation mode, the variable valve operating mechanism M activates the valve system accordingly. The fuel supply system provides the active cylinders with fuel in response to the foregoing command. Needless to say, the present invention is effectively applicable to ordinary engines which do not have the partial cylinder operation mode.

The invention being thus described, it will be obvious that the same may be varied in may ways. Such variations are not to be regarded as a departure from the spirit and scope of the invention, and all such modifications as would be obvious to one skilled in the art are intended to be included within the scope of the following claims.

What is claimed is:

1. An engine cooling system for a horizontal engine disposed in a front part of a vehicle and having a crankshaft being axially parallel with an axle of the vehicle, the engine having a partial cylinder operation mode by disconnecting a portion of cylinders and including a catalyst downstream of an exhaust manifold, the exhaust manifold being disposed in front of the engine, the engine cooling system comprising:

a radiator for radiating heat from engine cooling water, the radiator being positioned in front of the engine and extending at least across substantially the entire transverse width of the engine, a first transverse portion of the radiator adapted for directing first cooling airstreams from a front part of the vehicle onto the engine while the vehicle is in motion;

a radiator fan assembly consisting of a single radiator fan for generating second cooling airstreams, the radiator fan being disposed in a vicinity of a second portion of the radiator and at a position offset from a front side of the exhaust manifold toward a lateral side of the vehicle such that the first portion of the radiator is positioned laterally offset from the single radiator fan; and a fan shroud for directing the second cooling airstreams from the single radiator fan to the rear part of the vehicle, while the single radiator fan is operating, so that the second cooling airstreams diverge from the engine.

2. An engine cooling system as in claim 1, wherein the catalyst is disposed just under the exhaust manifold.

3. An engine cooling system as in claim 2, wherein the catalyst is an oxidation catalyst.

4. An engine cooling system as in claim 2, wherein the catalyst is a three-way catalyst.

5. An engine cooling system as in claim 1, wherein the catalyst is disposed in the middle of an exhaust pipe.

6. An engine cooling system as in claim 5, wherein the catalyst is a three-way catalyst.

7. The engine cooling system as in claim 1, wherein the fan shroud directs the second cooling airstreams to a clutch which transmits power of the engine.

8. The engine cooling system as in claim 1, wherein the fan shroud directs the second cooling airstreams to a transmission which transmits power of the engine.

* * * * *